United States Patent [19]

Shiiki et al.

[11] Patent Number: 5,017,621

[45] Date of Patent: May 21, 1991

[54] POLYPROPYLENE RESIN PRE-EXPANDED BEADS, MANUFACTURING METHOD THEREOF AND EXPANSION-MOLDING METHOD USING SAID BEADS

[75] Inventors: Hitoshi Shiiki, Ibaraki; Minoru Tada; Kyoichi Nakamura, both of Kamisu, all of Japan

[73] Assignee: Kanegafuchi Kagaku Kogyo Kabushiki Kaisha, Osaka, Japan

[21] Appl. No.: 497,281

[22] Filed: Mar. 22, 1990

Related U.S. Application Data

[62] Division of Ser. No. 282,137, Dec. 9, 1988, Pat. No. 4,931,477.

[30] Foreign Application Priority Data

Dec. 11, 1987 [JP] Japan ................................ 62-315008

[51] Int. Cl.$^5$ ........................... C08J 9/232; C08J 9/22

[52] U.S. Cl. ................................ 521/58; 264/DIG. 7; 264/DIG. 9; 264/DIG. 16; 521/56; 521/60; 521/143

[58] Field of Search ..................... 521/56, 58, 60, 143; 264/DIG. 7, DIG. 9, DIG. 16

Primary Examiner—Morton Foelak
Attorney, Agent, or Firm—Armstrong, Nikaido, Marmelstein Kubovcik & Murray

[57] ABSTRACT

The present invention provides polypropylene resin pre-expanded beads formed by shrinking polypropylene resin pre-expanded beads originally having a bulk density of not higher than 0.0930 g/cc to give them a bulk volume ratio of 10–75% at normal temperature and normal pressure, a manufacturing method thereof and an expansion-molding method with the aforementioned pre-expanded beads. According to this invention, it is possible to greatly reduce storing and transporting costs per unit weight of pre-expanded beads.

10 Claims, No Drawings

POLYPROPYLENE RESIN PRE-EXPANDED BEADS, MANUFACTURING METHOD THEREOF AND EXPANSION-MOLDING METHOD USING SAID BEADS

This is a division, of application Ser. No. 282,137 filed Dec. 9, 1988 now U.S. Pat. No. 4,931,477.

BACKGROUND OF THE INVENTION

1. Field of the Invention

The present invention relates to polypropylene resin pre-expanded beads for obtaining polypropylene resin expansion-molded products in a mold, a manufacturing method of said beads and an expansion-molding method using said beads, more particularly, it pertains to polypropylene resin pre-expanded beads which lend themselves to cutdown on costs per unit weight for storing and transporting pre-expanded beads, manufacturing methods thereof and an expansion-molding method therewith.

2. Description of the Prior Art

With polyolefin resins including polypropylene resins, generally being inferior in foaming agent holding property, it is difficult, unlike with styrene resins, to keep in store the base material resin pellets impregnated with any foaming agent, in their unexpanded state, to transport them to the desired destination in the desired time and, then, to produce pre-expanded beads by use of a simple pre-expanding machine in which they are heated with steam, etc.

Accordingly, as a method of obtaining polyolefin resin pre-expanded beads, a method of impregnating the base material resin pellets with a foaming agent and thereafter, quickly expanding them at the desired expansion ratio (for example, Patent Publication No. 56-1344 and Patent Laid-Open No. 58-197027), etc., are employed. Now, speaking of one of characteristic features of bulk density of polyolefin resin pre-expanded beads obtained in this way, when, for example, a cross-linked or non-cross-linked polyethylene resin is used as the base material, its bulk density, after it has been left intact at the normal temperature and at atmospheric pressure, becomes higher than that just after its expansion, i.e., it has shrinking tendency. In contrast, with a polypropylene resin as the base material, as according to this invention, its bulk density just after its expansion will barely undergo change, even after it has been left intact at the normal temperature and at atmospheric pressure. Thus, according to the conventional technique, polypropylene resin pre-expanded beads are once kept in store with their bulk density unaltered they had immediately after their expansion, and transported to any desired destination in any desired time, and subjected to an expansion-molding in a mold.

When expansion-molded products are produced rapidly by use of pre-expanded beads, it is necessary to once keep the pre-expanded beads in store, so that the necessary amount may be transported in the desired time to the places where an expansion-molding is to be done therewith. In view of the fact that customers for expansion-molded products exist in wide areas, the places where the expansion-molding is to be done with the beads should desirably be provided in wide areas. Accordingly, it is not a rare occasion that pre-expanded beads are transported to remote places. In this situation, to keep in store pre-expanded beads generally having bulk density of 0.0090–0.0930 g/cc until the time when their use is necessary and, then, to transport them to remote places in the desired time, vast storing areas and large capacity transporting means are necessary, and as a consequence, the storing and transporting costs per unit weight of bead will become invariably enormous.

SUMMARY OF THE INVENTION

An object of this invention is to provide polypropylene resin pre-expanded beads which have small bulk volume ratios, thereby cutting back on the storing and transporting costs per unit weight of bead.

Another object of this invention is to provide a manufacturing method of polypropylene resin pre-expanded beads which give small bulk volume ratios.

Still another object of this invention is to provide a manufacturing method of expansion-molded products using polypropylene resin pre-expanded beads which have small bulk volume ratios.

Other objects and advantages of this invention will become apparent to those skilled in the art from the following detailed description taken hereunder.

The present inventors, as a result of their assiduous pursuit of studies on their firm belief that the foregoing objects may be achieved by holding the bulk density of pre-expanded beads as high as possible, i.e., by bringing them into their shrunk state while keeping them in store and while in transit, have found out the facts that the pre-expanded beads may be shrunk to any desired bulk density by reducing the internal pressure of the polypropylene resin pre-expanded beads to below atmospheric pressure, or further, by applying a pressure on them from outside, that the pre-expanded beads which have once been shrunk permit long maintenance of their bulk density near the value they had just after their having shrunk, and further that the pre-expanded beads can restore their bulk density they had before shrunk through their pre-expansion by impregnating the interior of each bead with air or inorganic gas according to well-known technique (Patent Publication No. 51-22951). Then, they have found that when an expansion-molding is performed using pre-expanded beads which have been restored to their preshrunk bulk density, the expansion-molded products thus obtained give physical properties comparable to those obtained by the conventional technique and that in that way, the aforementioned problems may be solved, on the finding of which they have completed this invention.

DETAILED DESCRIPTION OF THE INVENTION

The present invention encompasses;

as a first aspect, polypropylene resin pre-expanded beads formed by getting polypropylene resin pre-expanded beads having bulk density of not higher than 0.0930 g/cc shrunk to give a bulk volume ratio of 10–75% at the normal temperature and the normal pressure, as a second aspect, a manufacturing method of polypropylene resin pre-expanded beads which comprises reducing the pressure inside each of the polypropylene resin pre-expanded beads having bulk density of not higher than 0.0930 g/cc, and thereafter, taking them out into an atmosphere held at the normal temperature and the normal pressure, as a third aspect, a manufacturing method of polypropylene resin pre-expanded beads which comprises reducing the pressure inside each of the polypropylene resin pre-expanded beads having bulk density of not higher than 0.0930 g/cc, further, subjecting said beads to pressure and, thereafter, taking them out into an atmosphere held at the normal temperature and the normal pressure, and as a fourth aspect, an expansion-molding method of polypropylene resin pre-expanded beads comprising getting polypropylene resin pre-expanded beads having bulk density of not higher than 0.0930 g/cc shrunk to give a bulk volume ratio of 10–75% at the normal temperature and the normal pressure, then, impregnating the interior of each of said beads with air to thus substantially restore the bulk volume ratio of 100% and, thereafter, subjecting to an expansion-molding in a mold.

The base material resins of polypropylene resin pre-expanded beads used in this invention are not particularly limited, but for example, propylene homopolymer, random copolymers and block copolymers, etc., of ethylene or other α-olefines with propylene as their main component may be used singly or in mixture; preferably, ethylene-propylene random copolymers with ethylene content 1.0–6.0% by weight are suitable.

In the method of manufacturing pre-expanded beads from any of polypropylene resins, normally, for facility in lending itself to pre-expansion, polypropylene resin is prelimiarily fused using an extruder, kneader, Banbury mixer, roll, etc., and molded into any desirable one of pellet forms such as a circular column, elliptical column, sphere, cube, rectangular parallelipiped, etc., with the beads mean diameter 0.1–10 mm, more preferably, 0.7–5 mm, thereafter to be provided for pre-expansion.

For the pre-expansion method which is not particularly limited, for example, a method of impregnating propylene resin beads with a volatile foaming agent in a pressure vessel, then, dispersing the beads in water while stirring, heating them to a specified expanding temperature and, thereafter, discharging the resultant water dispersion into a low pressure region, and the like methods are utilized. Mentioned as volatile foaming agents utilized in this application, for example, are aliphatic hydrocarbons such as propane, butane, pentane, hexane, etc., alicyclic hydrocarbons such as cyclopentane, cyclobutane, and halogenated hydrocarbons such as trichloromonofluoromethane, dichlorodifluoromethane, dichlorotetrafluoroethane, trichlorotrifluoroetane, methyle chloride, methylene chloride, ethyl chloride, etc. These foaming agents may be used singly or in combination of two or more. The amount used of the foaming agent is not particularly limited and appropriate amount may be used in accordance with the desired expansion ratio of the propylene resin pre-expanded beads, normally the amount used being 5–50 parts (by weight; the same applies hereafter) in proportion to 100 parts of propylene resin.

In preparing the aforementioned water dispersion, used as the dispersant are, for example, potassium phosphate, basic magnesium carbonate, basic zinc carbonate, calcium carbonate, etc., and a small amount of surface active agents, e.g., sodium dodecyl benzene sulfonate, sodium n-parafin sulfonate, sodium α-olefin sulfonate, etc.

The amount of such dispersants and surface active agents used differ depending on their types and the type of propylene resin beads and the amount used, but normally, the amount of dispersants is 0.2–3 parts and that of surface active agent is 0.001–0.1 part in proportion to 100 parts of water.

The amount to be added of the propylene resin beads containing any of the aforementioned volatile foaming agents is preferably 200–100 parts in proportion to 100 parts of water, for their good dispersibility in water.

The water dispersion prepared in this way is heated under increased pressure and, then, discharged into a low pressure region through a 2–10 mm orifice, whereby propylene resin beads are pre-expanded, thus yielding the propylene resin pre-expanded beads to be used according to this invention.

The bulk density of the pre-expanded beads used according to this invention should be not higher than 0.0930 g/cc; this bulk density is adjustable through change in the expansion ratio which may be effected by altering the amount of foaming agent used. The pre-expanded beads with bulk density higher than 0.0930 g/cc will give bulk volume ratio higher than 75%, thus detracting from adequate attainment of this invention's purpose of cutting back on the storing and transporting costs. For the lower limit, appropriate value is on the order of 0.0090 g/cc in the bulk density or 60 times in expansion ratio.

As the means for shrinking the beads by lowering the internal pressure of the pre-expanded beads, there are available a method of releasing internal gas by treating the beads for a given period of time in steam at a temperature lower than the melting point of the polypropylene resin where permanent strain due to thermal deformation or fusion and sticking of resin will not occur, preferably, lower than 110° C., or a method of releasing an internal gas by leaving the pre-expanded beads for a given period of time at a pressure lower than atmospheric pressure, preferably in a vessel held nearly under vacuum, and so forth. The foregoing means may also be used in combination.

The pre-expanded beads subjected to the above treatment may include pre-expanded beads, the inside of each of said beads is filled with a volatile foaming agent immediately after being produced or pre-expanded beads, whose volatile foaming agent has been replaced with air after being dried or being left to stand for a long period of time, or the like, after their production.

In recovering a volatile foaming agent contained in pre-expanded beads, one method is to introduce steam used for heating treatment into a gas holder in which pre-expanded beads filled with a volatile foaming agent immediately after their production are charged and to condense the steam, whereby the volatile foaming agent is separated and recovered. Another method is to introduce a releasing gas from a vacuum equipment such as a pump into a gas holder, when the method for leaving the pre-expanded beads for a given period of time in a vessel held nearly under vacuum was employed.

As the means for further shrinking the pre-expanded beads whose internal pressure have been reduced to desired bulk volume ratios, there are available a method of subjecting the pre-expanded beads to pressure of, for example, air, inorganic gas or liquids such as water for a short period of time to thus adjust the amount of shrinkage, adjusting the amount of shrinkage by mechanical compression, e.g., amount of compression provided by use of a press, and so forth. The foregoing means may also be used in combination.

By the aforementioned method, the pre-expanded beads are shrunk to bulk volume ratios of 10–75% at the normal temperature and atmospheric pressure. The bulk volume ratio according to this invention is the ratio (%) of the bulk volume of the pre-expanded beads to their bulk volume they had before their shrinkage which is set to 100% for their constant weight:

$$\text{Bulk volume ratio (\%)} = \frac{\text{Bulk volume after shrinkage}}{\text{Bulk volume before shrinkage}} \times 100$$

If the aforementioned bulk volume ratio exceeds 75%, the effect of cutting back on the storing and transporting costs is small as hereabove described and lower than 10% bulk volume ratio can not be obtained by the method of this invention.

In the following, the present invention will be described further in detail by way of examples and a comparative example, but it will not be in any way limited by these examples.

EXAMPLE 1

Three types of pre-expanded beads of ethylene-propylene random copolymer with ethylene content 3.3% by weight as their base material resin, one bead weighing approx. 1.8 mg-one having a density of 0.1500 g/cc and a bulk density of 0.0930 g/cc, another having a density of 0.0800 g/cc and a bulk density of 0.0500 g/cc and still another having a density of 0.0450 g/cc and a bulk density of 0.0280 g/cc-were respectively treated for 20 min. in steam at 95°–100° C., then, put in a pressure vessel to be air pressurized for 2 min., thereafter, taken out into an atmosphere held at the normal temperature and the normal pressure, preparing shrunken pre-expanded beads.

At this time, the relationship between the air-pressurizing pressure and the bulk volume ratio is as shown in Table 1—1.

TABLE 1-1

| | Air-pressurizing pressure and bulk volume ratio | | | | | | | |
|---|---|---|---|---|---|---|---|---|
| | Original bulk density | Air-pressurizing pressure (kg/cm²) | | | | | | |
| No. | (g/cc) | 0 | 0.5 | 1 | 2 | 4 | 6 | 8 | 10 |
| 1 | 0.0930 | 98% | 96 | 95 | 93 | 87 | 83 | 76 | 74(a) |
| 2 | 0.0500 | 86 | 83 | 80 | 75 | 60 | 53 | 52 | 47(b) |
| 3 | 0.0280 | 64(c) | 63 | 61 | 54 | 45 | 39 | 36 | 32(d) |

Next, the relationship between the treating conditions (temperature and time) in steam and the bulk volume ratio was examined. The pre-expanded beads having the original bulk density of 0.0280 g/cc were treated in steam under respective conditions as set forth in Table 1-2, then air-pressurized under conditions of 10 kg/cm² and 2 min., thereafter, taken out into an atmosphere held at the normal temperature and the normal pressure to determine their bulk volume ratios. The results obtained are as given in Table 1-2.

TABLE 1-2

| | Treating conditions in steam and bulk volume ratio | | | | | | |
|---|---|---|---|---|---|---|---|
| | Treating temperature | Air-pressurizing pressure (kg/cm²) | | | | | |
| No. | (°C.) | 0 | 5 | 10 | 15 | 20 | 25 | 30 |
| 1 | 70–80 | 100% | 92 | 82 | 74 | 68 | 65 | 62 |
| 2 | 85–90 | 100 | 82 | 67 | 56 | 48 | 42 | 40 |
| 3 | 95–100 | 100 | 75 | 50 | 36 | 32 | 32 | 32 |
| 4 | 105–110 | 100 | 60 | 38 | 32 | 32 | 32 | 32 |

Further, in order to provide the shrunken pre-expanded beads obtained in this way for expansion-molding in a mold, among the pre-expanded beads obtained under conditions given in Table 1—1, four types- No. 1 beads giving bulk volume ratio of 74% (a), whose original bulk density was 0.0930 g/cc and which were formed under an air-pressurizing pressure of 10 kg/cm, No. 2 beads giving a bulk volume ratio of 47 (b), whose original bulk density was 0.0500 g/cc and which were formed under an air-pressurizing pressure of 10 kg/cm² and No. 3 beads giving bulk volume ratios of 64% (c) and 32% (d), which original bulk density was 0.0280 g/cc and which were formed under air-pressurizing pressures of 0 kg/cm² and 10 kg/cm²—were treated for 60 min. in air at 80° C. and 8.5 kg/cm², thereby impregnating the interior of each bead with air and, thereafter, taken out into an atmosphere held at the normal temperature and the normal pressure. With all these four types, beads with their bulk volume ratios substantially recovered to 100% and having equivalent appearances as those observed before their shrinkage were obtained.

Then, the pre-expanded beads with their bulk volume ratios recovered to 100% were provided for expansion-molding in a mold.

As the physical properties obtained, the density, fusing rate, dimensional shrinkage and surface appearance were evaluated by the under-mentioned methods: Density of an expansion-molded prosuct:

It was determined by the undermentioned formula by measuring the volume of the expansion-molded product by the submerging method:

Density of an expansion-molded product (g/cc) =

$$\frac{\text{Weight of an expansion-molded product (g)}}{\text{Volume of an expansion-molded product (cc)}}$$

Fusing rate

After the surface of an expansion-molded product has been cracked to a depth of approx. 5 mm, the expansion-molded product is split along this crack. Then the fracture is observed to determine the percentage of the fused beads in proportion to the total number of beads.
⊚ : Fusing rate not lower than 80%
○ : Fusing rate 60 to lower than 80%
△: Fusing rate 50 to lower than 60%
x: Fusing rate lower than 50%

Normally, the satisfactory fusing rate level as an expansion-molded product is at least 60%.
Dimensional shrinikage The shrinkage relative to a mold dimension is calculated by measuring the dimension of the expansion-molded product with slide calipers. The shrinkage of up to 5% designated hereunder by "△" is a level permissible depending on uses.
⊚ : Shrinkage less than 3%
△: Shrinkage 3 to 5%
x: Shrinkage more than 5%
Surface appearance The expansion-molded products are evaluated according to the undermentioned criteria:
○ : The product's surface is not irregular and almost no gaps are observed between neighboring beads.
△: The product's surface is not irregular, but gaps between neighboring beads are rather conspicuous.
x: The product's surface is irregular and gaps between neighboring beads are extremely large.

The evaluation results were as given in Table 1-3. As apparent from Table 1-3, the expansion-molded products obtained were excellent in all of the fusing rate, dimensional shrinkage and surface appearance.

TABLE 1-3

| | Expansion-molded products evaluation results | | | | |
|---|---|---|---|---|---|
| | Pre-expanded beads' bulk density | Expansion-molded product evaluation items | | | |
| No. | (g/cc) | Density (g/cc) | Fusing rate | Dimensional shrinkage | Surface appearance |
| 1 | 0.0930(a) | 0.1053 | ● | ○ | ○ |
| 2 | 0.0500(b) | 0.0559 | ● | ○ | ○ |
| 3 | 0.0280(c) | 0.0305 | ● | ○ | ○ |
| 4 | 0.0280(d) | 0.0318 | ● | ○ | ○ |

EXAMPLE 2

Two types of pre-expanded beads of ethylene-propylene random random copolymer with ethylene content 4.5% by weight, one bead weighing approx. 1.3 mg—one having a density of 0.0290 g/cc and a bulk density of 0.0170 g/cc, and the other having a density of 0.0150 g/cc and a bulk density of 0.0090 g/cc—were respectively treated for 20 min. in steam at 95°-100° C., then, put in a pressure vessel to be air-pressurized for 2 min., and thereafter, taken out into an atmosphere held at the normal temperature and the normal pressure, preparing shrunken pre-expanded beads.

The relationship between the air pressurizing pressure and the bulk volume ratio at this time is as given in Table 2-1.

TABLE 2-1

| | Air-pressurizing pressure and bulk volume ratio | | | | | | |
|---|---|---|---|---|---|---|---|
| | Original bulk density | Air-pressurizing pressure (kg/cm²) | | | | | |
| No. | (g/cc) | 0 | 0.5 | 1 | 2 | 4 | 6 | 8 |
| 1 | 0.0170 | 32% | 26 | 23 | 21 | 20(a) | 20 | 20 |
| 2 | 0.0090 | 17(b) | 15 | 14 | 12 | 11(c) | 11 | 11 |

Next, the relationship between the treating conditions (temperature and time) in steam and bulk volume ratio were examined. The pre-expanded beads having the original bulk density of 0.0170 g/cc were treated in steam under respective conditions as set forth in Table 2—2, then air-pressurized under conditions of 4 kg/cm² and 2 min., then, taken out into an atmosphere held at the normal temperature and the normal pressure to determine the bulk volume ratios. The results obtained are as given in Table 2—2.

TABLE 2-2

| | Treating conditions in steam and bulk volume ratio | | | | | | | |
|---|---|---|---|---|---|---|---|---|
| | Treating temperature | Treating time (min) | | | | | | |
| No. | (°C.) | 0 | 5 | 10 | 15 | 20 | 25 | 30 |
| 1 | 75-80 | 100% | 72 | 47 | 36 | 30 | 27 | 25 |
| 2 | 85-90 | 100 | 63 | 47 | 32 | 26 | 23 | 20 |
| 3 | 95-100 | 100 | 45 | 30 | 22 | 20 | 20 | 20 |
| 4 | 105-110 | 100 | 42 | 27 | 20 | 20 | 20 | 20 |

In order to provide the shrunken pre-expanded beads obtained in this way for expansion-molding in a mold, among the pre-expanded beads obtained under the conditions given in Table 2-1, three types of beads-one whose original bulk density was 0.0170 g/cc and which was formed under an air-pressurizing pressure of 4 kg/cm² to give a bulk volume ratio of 20%(a), and the other whose original bulk density was 0.0090 g/cc and which were formed under air-pressurizing pressures of 0 kg/cm² and 4 kg/cm², to give bulk volume ratios of 17% (b) and 11% (c)—were respectively treated for 120 min, in air of 80° C. and 8.5 kg/cm², thereby impregnating each bead interior with air, and thereafter, taken out into an atmosphere held at the normal temperature and the normal pressure. With all these three types of beads, bulk volume ratios were substantially restored to 100% and their appearances were equivalent to those before their shrinkage.

Then, these three types were provided for expansion-molding in a mold. Evaluation results on the expansion-molded products thus obtained by the method of Example 1 are as shown in Table 1 are as shown in Table 2-3, Table 2-3 shows that expansion-molded products obtained were excellent in all of the fusing rate, dimensional shrinkage as well as surface appearance.

TABLE 2-3

| | Expansion-molded product evaluation results | | | | |
|---|---|---|---|---|---|
| | Pre-expanded beads' bulk density | Expansion-molded product evaluation items | | | |
| No. | (g/cc) | Density (g/cc) | Fusing rate | Dimensional shrinkage | Surface appearance |
| 1 | 0.0170(a) | 0.0200 | ● | Δ | ○ |
| 2 | 0.0090(b) | 0.0102 | ● | Δ | ○ |
| 3 | 0.0090(c) | 0.0109 | ● | Δ | ○ |

EXAMPLE 3

Two types of pre-expanded beads of ethylene-propylene block copolymer with etylene content 7.5% by weight as the base material resin, one bead weighing approx. 1.8 mg—one having a density of 0.0820 g/cc and a bulk density of 0.0510 g/cc and the other having a density of 0.0380 g/cc and a bulk density of 0.0240 g/cc—were respectively treated in steam at 95°-100° C. for 20 min., then, put in a pressure vessel to be air-pressurized for 2 min., and thereafter, taken out into an atmosphere held at the normal temperature and the normal pressure, preparing shrunken pre-expanded beads.

At this time, the relationship between the air-pressurizing pressure and bulk volume ratio was as given in Table 3-1.

TABLE 3-1

| | Air-pressurizing pressure and bulk volume ratio | | | | | | | |
|---|---|---|---|---|---|---|---|---|
| | Original bulk density | Air-pressurizing pressure (kg/cm²) | | | | | | |
| No. | (g/cc) | 0 | 0.5 | 1 | 2 | 4 | 6 · 8 | 10 |
| 1 | 0.0510 | 91% | 88 | 86 | 82 | 70 | 58 54 | 52(a) |
| 2 | 0.0240 | 68(b) | 64 | 60 | 54 | 42 | 36 34 | 34(c) |

Next, the relationship between the treating conditions (temperature and time) in steam and the bulk volume ratio was examined. The pre-expanded beads having the original bulk density of 0.0240 g/cc were treated in steam under respective conditions as set forth in Table 3-2, then air-pressurized under conditions of 10 kg/cm² and 2 min., then, taken out into an atmosphere held at the normal temperature and the normal pressure to determine the bulk volume ratios. The results obtained are as given in Table 3-2.

TABLE 3-2

| | Treating conditions in steam and bulk volume ratio | | | | | | | |
|---|---|---|---|---|---|---|---|---|
| | Treating temperature | Treating time (min) | | | | | | |
| No. | (°C.) | 0 | 5 | 10 | 15 | 20 | 25 | 30 |
| 1 | 75–80 | 100% | 93 | 85 | 66 | 57 | 54 | 52 |
| 2 | 85–90 | 100 | 88 | 70 | 52 | 46 | 42 | 38 |
| 3 | 95–100 | 100 | 76 | 43 | 38 | 34 | 34 | 34 |
| 4 | 105–110 | 100 | 71 | 42 | 35 | 34 | 34 | 34 |

Further, in order to provide the shrunken pre-expanded beads obtained in this way for expansion-molding in a mold, among the pre-expanded beads obtained under the conditions given in Table 3-1, three types of beads—one whose original bulk density was 0.0510 g/cc and which was formed under an air pressurizing pressure of 10 kg/cm², to give a bulk volume ratio of 52% (a) and the other whose original bulk density was 0.0240 g/cc and which were formed under air pressurizing pressures of 0 kg/cm² and 10 kg/cm², to give bulk volume ratios of 68% (b) and 34% (c)—were respectively treated in air at 80° C. and 8.5 kg/cm² for 60 min., thereby to impregnate each bead interior with air, and thereafter, taken out into an atmosphere at the normal temperature and the normal pressure. With all three types of beads, the bulk volume ratios were substantially restored to 100% and appearances were equivalent to those before their shrinkage.

Then, these beads were provided for expansion-molding in a mold. Results of evaluation by the method of Example 1 on the expansion-molded products obtained were excellent in all respects of the fusing rate, dimensional shrinkage and surface appearance.

TABLE 3-3

| | Expansion-molded products evaluation results | | | |
|---|---|---|---|---|
| | Pre-expanded beads' bulk | Expansion-molded product evaluation items | | |
| No. | density (g/cc) | Density (g/cc) | Fusing rate | Dimensional shrinkage | Surface appearance |
| 1 | 0.0510(a) | 0.0585 | ○ | ○ | ○ |
| 2 | 0.0240(b) | 0.0268 | ● | ○ | ○ |
| 3 | 0.0240(c) | 0.0276 | ● | ○ | ○ |

EXAMPLE 4

Two types of pre-expanded beads of propylene homopolymer as the base material resin, one bead weighing approx. 1.8 mg—one having a density of 0.0840 g/cc and a bulk density of 0.0525 g/cc and the other having a density of 0.0390 g/cc and a bulk density of 0.0245 g/cc—were treated in steam at 95°–100° C. for 20 min., then, put in a pressure vessel to be air-pressurized for 2 min., and thereafter, taken out into an atmosphere held at the normal temperature and the normal pressure, giving shrunken pre-expanded beads.

The relationship between the air pressurizing pressure and the bulk volume ratio was as given in Table 4-1.

TABLE 4-1

| | Air-pressurizing pressure and bulk volume ratio | | | | | | | |
|---|---|---|---|---|---|---|---|---|
| | Original bulk density | Air-pressurizing pressure (kg/cm²) | | | | | | |
| No. | (g/cc) | 0 | 0.5 | 1 | 2 | 4 | 6 | 8 | 10 |
| 1 | 0.0525 | 97% | 93 | 90 | 88 | 83 | 68 | 60 | 58(a) |

TABLE 4-1-continued

| | Air-pressurizing pressure and bulk volume ratio | | | | | | | |
|---|---|---|---|---|---|---|---|---|
| | Original bulk density | Air-pressurizing pressure (kg/cm²) | | | | | | |
| No. | (g/cc) | 0 | 0.5 | 1 | 2 | 4 | 6 | 8 | 10 |
| 2 | 0.0245 | 81 | 77 | 68 | 57 | 47 | 43 | 40 | 39(b) |

Next, the relationship between the treating conditions (temperature and time) and the bulk volume ratio was examined. The pre-expanded beads having the original bulk density of 0.0245 g/cc were treated in steam under respective conditions as set forth in Table 4-2, then air-pressurized under air-pressurizing conditions of 10 kg/cm² and 2 min., then, taken out into an atmosphere held at the normal temperature and the normal pressure to determine the bulk volume ratios, the results of thich were as given in Table 4-2.

TABLE 4-2

| | Treating conditions in steam and bulk volume ratio | | | | | | | |
|---|---|---|---|---|---|---|---|---|
| | Treating temperature | Treating time (min) | | | | | | |
| No. | (°C.) | 0 | 5 | 10 | 15 | 20 | 25 | 30 |
| 1 | 75–80 | 100% | 94 | 84 | 72 | 60 | 55 | 53 |
| 2 | 85–90 | 100 | 86 | 73 | 58 | 52 | 47 | 45 |
| 3 | 95–100 | 100 | 81 | 58 | 45 | 39 | 39 | 38 |
| 4 | 105–110 | 100 | 72 | 48 | 40 | 38 | 38 | 38 |

Further, in order to provide the shrunken pre-expanded beads obtained in this way for expansion-molding in a mold, among the pre-expanded beads obtained under the conditions given in Table 4-1, two types of beads—one whose original bulk density was 0.0525 g/cc and which was formed under an air pressurizing pressure of 10 kg/cm², to give a bulk volume ratio of 58% (a), and the other whose original bulk density was 0.0245 g/cc and which were formed under an air pressurizing pressures of 10 kg/cm², to give bulk volume ratio of 39% (b)—were respectively treated in air at 80° C. and 8.5 kg/cm² for 60 min., to impregnate each bead interior with air, and then, taken out into an atomsphere held at the normal temperature and the normal pressure. With both these two types, their bulk volume ratios were substantially restored to 100% and their appearances were equivalent to those before their shrinkage.

Then, these beads were provided for expansion-molding in a mold. Results of evaluation by the method of Example 1 on the expansion-molded products thus obtained were as given in Table 4-3, which reveals that the expansion-molded products obtained were excellent in all of the fusing rate, dimensional shrinkage and surface appearance.

TABLE 4-3

| | Expansion-molded products evaluation results | | | |
|---|---|---|---|---|
| | Pre-expanded beads' bulk | Expansion-molded product evaluation items | | |
| No. | density (g/cc) | Density (g/cc) | Fusing rate | Dimensional shrinkage | Surface appearance |
| 1 | 0.0525(a) | 0.0606 | ○ | ○ | ○ |
| 2 | 0.0245(b) | 0.0285 | ○ | ○ | ○ |

EXAMPLE 5

Two types of pre-expanded beads of ethylene-propylene random copolymer with ethylene content 3.3% by weight as their base material resin, one bead weighing approx. 1.8 mg—one have a density of 0.0800 g/cc and a bulk density of 0.0500 g/cc and the other having a density of 0.0450 g/cc and a bulk density of 0.0280 g/cc—were treated in a vacuum vessel at 95°–100° C. and under a pressure of —0.8 kg/cm$^2$ for 20 min., then, transferred into another pressure vessel to be air-pressuized for 2 min., and thereafter, taken out into an atmosphere to thus obtain shrunken pre-expanded beads.

The relationship at this time between the air-pressurizing pressure and the bulk volume ratio was as shown in Table 5-1.

TABLE 5-1

| | Air-pressurizing pressure and bulk volume ratio | | | | | | | |
|---|---|---|---|---|---|---|---|---|
| | Original bulk density | Air-pressurizing pressure (kg/cm$^2$) | | | | | | |
| No. | (g/cc) | 0 | 0.5 | 1 | 2 | 4 | 6 | 8 | 10 |
| 1 | 0.0500 | 88% | 86 | 82 | 78 | 62 | 56 | 54 | 51(a) |
| 2 | 0.0280 | 67(b) | 65 | 62 | 56 | 48 | 42 | 38 | 35(c) |

Next, the relationship between the treating conditions (temperature, pressure and time) in the vacuum vessel and the bulk volume ratio were examined. The pre-expanded beads having the original bulk density of 0.0280 g/cc were treated in vacuum under respective conditions as set forth Table 5-2, then air-pressurized under air-pressurizing conditions of 10 kg/cm$^2$ and 2 min., then, taken out into an atmosphere held at the normal temperature and the normal pressure to determine the bulk volume ratios. The results obtained were given in Table 5-2.

TABLE 5-2

| | Treating conditions in vacuum vessel and bulk volume ratio | | | | | | |
|---|---|---|---|---|---|---|---|
| | Inside-vessel pressure | Treating temperature | Treating time (min) | | | | |
| No. | (kg/cm$^2$) | (°C.) | 0 | 10 | 20 | 30 | 40 |
| 1 | | 75–80 | 100% | 81 | 67 | 62 | 57 |
| 2 | −0.6 | 85–90 | 100 | 73 | 59 | 53 | 50 |
| 3 | | 95–100 | 100 | 59 | 45 | 41 | 39 |
| 4 | | 75–80 | 100% | 68 | 57 | 51 | 47 |
| 5 | −0.8 | 85–90 | 100 | 54 | 43 | 40 | 38 |
| 6 | | 95–100 | 100 | 42 | 35 | 34 | 34 |

Further, in order to provide the shrunken pre-expanded beads obtained in this way for expansion-molding in a mold, among the pre-expanded beads obtained under the conditions of Table 5-1, three types of beads—one whose original bulk density was 0.0500 g/cc and which was formed under an air pressurizing pressure of 10 kg/cm$^2$, to give a bulk volume ratio of 51% (a), and the other whose original bulk density was 0.0280 g/cc and which were formed under an air pressurizing pressures of 0 kg/cm$^2$ and 10 kg/cm$^2$, to give bulk volume ratio of 67% (b) and 35% (c)—were respectively treated in air at 80° C. and 8.5 kg/cm$^2$ for 60 min, thereby to impregnate each bead interior with air, and thereafter, taken out into an atomsphere held at the normal temperature and the normal pressure. With all three types, their bulk volume ratios were substantially restored to 100% and their appearances observed were equivalent to those they gave before their shrinkage.

Then, these beads were provided for expansion-molding in a mold. The expansion-molded products obtained evaluated by the method of Example 1. The results were as given in Table 5-3, which shows that the expansion-molded products obtained were excellent in all of the fusing rate, dimensional shrinkage and surface appearance.

TABLE 5-3

| | Expansion-molded products evaluation results | | | | |
|---|---|---|---|---|---|
| | Pre-expanded beads' bulk density | Expansion-molded product evaluation items | | | |
| No. | (g/cc) | Density (g/cc) | Fusing rate | Dimensional shrinkage | Surface appearance |
| 1 | 0.0500(a) | 0.0577 | ○ | ○ | ○ |
| 2 | 0.0280(b) | 0.0310 | ● | ○ | ○ |
| 3 | 0.0280(c) | 0.0318 | ● | ○ | ○ |

EXAMPLE 6

Preexpanded beads of ethylene-propylene random copolymer with ethylene content 3.3% by weight as their base material resin, one bead weighing approx. 1.8 mg, which had a density of 0.0800 g/cc and a bulk density of 0.0500 g/cc, were treated in steam at 95°–100° C. for 20 min. and, then, subjected to continuous pressing on a roll press. The roll press was mainly composed of 2 rolls with diameter 20 cm and width 30 cm and was operated at 60 rpm. The pressing effects were compared between 3 conditions of roll clearance being 0.6 mm, 1.0 mm and 1.4 mm.

The pre-expanded beads had a rather flat shape and gave bulk volume ratios as listed in Table 6-1.

TABLE 6-1

| | Clearance between rolls and bulk volume ratio | |
|---|---|---|
| No. | Clearance (mm) | Bulk volume ratio (%) |
| 1 | 0.6 | 61 (a) |
| 2 | 1.0 | 68 |
| 3 | 1.4 | 72 |

Further, in order to provide the shrunken pre-expanded beads obtained in this way for expansion-molding in a mold, the pre-expanded beads listed as No. 1 in Table 6-1 whose original bulk density was 0.0500 g/cc and which was shrunk to give a bulk volume ratio of 61% (a), were treated in air at 80° C. and 5.8 kg/cm$^2$ for 60 min., to impregnate each bead's interior with air, and then, taken out into an atmosphere held at the normal temperature and the normal pressure. With the beads thus obtained, their bulk volume ratio was substantially restored to 100% and their appearance were found equivalent to that before their shrinkage.

The pre-expanded beads with their bulk volume ratio restored to 100% were provided for expansion-molding in a mold. The results of evaluation by the method of Example 1 on the expansion-molded product thus obtained were as given in Table 6-2. It is apparent from Table 6-2 that the expansion-molded product obtained was excellent in all of the fusing rate, dimensional shrinkage and surface appearance.

TABLE 6-2

| | Expansion-molded product evaluation results | | | |
|---|---|---|---|---|
| | Pre-expanded beads' bulk density | Expansion-molded product evaluation items | | |
| No. | (g/cc) | Density (g/cc) | Fusing rate | Dimensional shrinkage | Surface appearance |
| 1 | 0.0500(a) | 0.0581 | ○ | ○ | ○ |

EXAMPLE 7

Two types of pre-expanded beads of ethylene-propylene random copolymer with ethylene content 4.5% by weight as their base material resin, one bead weighing approx. 1.3 mg—one having a density of 0.0290 g/cc and a bulk density of 0.0170 g/cc and containing 23 parts of dichlorodifluoromethane in each of said beads as they are immediately after production and the other having a density of 0.0150 g/cc and a bulk density of 0.0090 g/cc and containing 28 parts of dichlorodifluoromethane as they are immediately after production—were respectively treated for 20 min. in steam at 95°–100° C., put in a pressure vessel to be air-pressurized for 2 mm, then taken out into an atmosphere held at the normal temperature and the normal pressure, thus obtaining shrunken pre-expanded beads.

The relationship between the air-pressurizing pressure and the bulk volume ratio is as shown in Table 7-1.

TABLE 7-1

| | Air-pressurizing pressure and bulk volume ratio | | | | | | |
|---|---|---|---|---|---|---|---|
| | Original bulk density | Air-pressurizing pressure (kg/cm$^2$) | | | | | |
| No. | (g/cc) | 0 | 0.5 | 1 | 2 | 4 | 6 | 8 |
| 1 | 0.0170 | 31% | 25 | 23 | 21 | 20(a) | 20 | 20 |
| 2 | 0.0090 | 17(b) | 15 | 14 | 12 | 11(c) | 11 | 11 |

Next, the relationship between the treating conditions (temperature, pressure and time) in steam and the bulk volume ratio was examined. The pre-expanded beads having the original bulk density of 0.0170 g/cc were treated in steam under respective conditions as set forth Table 7-2, then air-pressurized under air-pressurizing conditions of 4 kg/cm$^2$ and 2 min., thereafter taken out into an atmosphere held at the normal temperature and the normal pressure, to determine their bulk volume ratios. The results obtained are shown in Table 7-2.

TABLE 7-2

| | Treating conditions in steam and bulk volume ratio | | | | | | |
|---|---|---|---|---|---|---|---|
| | Treating temperature | Treating time (min) | | | | | |
| No. | (°C.) | 0 | 5 | 10 | 15 | 20 | 25 | 30 |
| 1 | 75–80 | 100% | 68 | 43 | 32 | 27 | 25 | 24 |
| 2 | 85–90 | 100 | 60 | 40 | 28 | 24 | 20 | 20 |
| 3 | 95–100 | 100 | 42 | 28 | 21 | 20 | 20 | 20 |
| 4 | 105–110 | 100 | 40 | 24 | 20 | 20 | 20 | 20 |

Further, in order to provide the shrunken pre-expanded beads obtained in this way for expansion-molding in a mold, among the pre-expanded beads obtained under conditions given in Table 7-1, three types-beads giving bulk volume ratio of 20% (a), whose original bulk density was 0.0170 g/cc and which were formed under an air-pressurizing pressure of 4 kg/cm$^2$, beads giving bulk volume ratios of 17% (b) and 11% (c), whose original bulk density was 0.0090 g/cc and which were formed under air-pressurizing pressures of 0 kg/cm$^2$ and 4 kg/cm$^2$ were treated for 120 min. in air at 80° C. and 8.5 kg/cm$^2$, thereby impregnating the interior of each bead with air, thereafter taken out into an atmosphere held at the normal temperature and the normal pressure. With all three types of beads, bulk volume ratios were substantially recovered to 100% and their appearances were equivalent to those before their shrinkage.

Then, these three types were provided for expansion-molding in a mold. Evaluation results on the expansion-molded products thus obtained by the method of Example 1 are as shown in Table 7-3. As Table 7-3 shows, the expansion-molded products were excellent in every respect of the fusing rate, dimensional shrinkage and surface appearance.

TABLE 7-3

| | Expansion-molded products evaluation results | | | | |
|---|---|---|---|---|---|
| | Pre-expanded beads' bulk density | Expansion-molded product evaluation items | | | |
| No. | (g/cc) | Density (g/cc) | Fusing rate | Dimensional shrinkage | Surface appearance |
| 1 | 0.0170(a) | 0.0202 | ● | △ | ○ |
| 2 | 0.0090(b) | 0.0105 | ● | △ | ○ |
| 3 | 0.0090(c) | 0.0108 | ● | △ | ○ |

COMPARATIVE EXAMPLE 1

Pre-expanded beads of ethylene-propylene random copolymer with ethylene content 3.3% by weight as their base material resin, one bead weighing approx. 1.8 mg, which had a density of 0.0160 g/cc and a bulk density of 0.0980 g/cc, were treated in steam at 90°–100° C. for 20 min., then, air-pressurized in a pressure vessel for 2 min., and, thereafter, taken out into an atmosphere held at the normal temperature and the normal pressure, thereby providing shrunken pre-expanded beads.

TABLE 8-1

| | Air-pressuring pressure and bulk volume ratio | | | | | | |
|---|---|---|---|---|---|---|---|
| | Original bulk density | Pressure (kg/cm$^2$) | | | | | |
| No. | (g/cc) | 0 | 2 | 4 | 6 | 8 | 10 | 15 |
| 1 | 0.0980 | 99% | 94 | 89 | 84 | 82 | 80 | 78 |

Next, the relationship between the treating conditions (temperature and time) in steam and the bulk volume ratio was examined. The pre-expanded beads having the original bulk density of 0.0980 g/cc were treated in steam under respective conditions as set forth in Table 8-2, then air-pressurized under air-pressurizing conditions of 15 kg/cm$^2$ and 2 min., then taken out into an atmosphere held at the normal temperature and the normal pressure, to determine their bulk volume ratios. The results obtained were as given in Table 8-2.

TABLE 8-2

| | Treating conditions in steam and bulk volume ratio | | | | | | | |
|---|---|---|---|---|---|---|---|---|
| | Treating temperature | Treating time (min) | | | | | | |
| No. | (°C.) | 0 | 5 | 10 | 15 | 20 | 25 | 30 |
| 1 | 75–80 | 100% | 96 | 93 | 90 | 89 | 88 | 88 |
| 2 | 85–90 | 100 | 94 | 89 | 86 | 85 | 83 | 82 |
| 3 | 95–100 | 100 | 91 | 84 | 80 | 78 | 78 | 78 |
| 4 | 105–110 | 100 | 87 | 81 | 79 | 78 | 78 | 78 |
| 4 | 115–120 | 100 | 84 | 77 | 72 | 69 | 68 | 68 |

As to the conditions for obtaining the pre-expanded beads of Table 8-2, at the No. 5 samples' treating temperature of 115°–120° C., sticking between beads was observed in treating times of not shorter than 10 min. and the obtained beads could no longer be provided for expansion-molding in a mold. Although at the No. 4's treating temperature of 105°–110° C., mutual sticking between beads did not occur, but even if their treating time was lengthened, the bulk volume ratio remained constant at 78%, thus being short of achieving this invention's effect of curtailment in their storing and transporting costs.

What is claimed is:

1. A manufacturing method of polypropylene resin pre-expanded beads comprising the steps of reducing the pressure inside polypropylene resin pre-expanded beads originally having a bulk density of not higher than 0.0930 g/cc so that the beads are shrunk to give a bulk volume ratio of 10–75% at normal temperature and pressure, and thereafter bringing said beads into an atmosphere held at normal temperature and normal pressure.

2. The manufacturing method of claim 1, wherein the step of reducing the pressure inside each of polypropylene resin pre-expanded beads is carried out by leaving intact said beads in steam.

3. The manufacturing method of claim 1, wherein the step of reducing the pressure inside each of polypropylene resin pre-expanded beads is carried out by leaving intact said beads in a vessel held lower than atmospheric pressure.

4. A manufacturing method of polypropylene resin pre-expanded beads comprising the steps of reducing the pressure inside polypropylene resin pre-expanded beads originally having a bulk density of not higher than 0.0930 g/cc so that the beads are shrunk to give a bulk volume ratio of 10–75% at normal temperature and pressure, then subjecting the beads to pressure, and thereafter bringing said beads into an atmosphere held at normal temperature and normal pressure.

5. The manufacturing method of claim 4, wherein the step of reducing the pressure inside each of polypropylene resin pre-expanded beads is carried out by leaving intact said beads in steam.

6. The manufacturing method of claim 4, wherein the step of reducing the pressure inside each of polypropylene resin pre-expanded beads is carried out by leaving intact said beads in a vessel held lower than atmospheric pressure.

7. The manufacturing method of claim 4, wherein the polypropylene resin pre-expanded beads are subjected to gas pressure after reduction of the inside pressure.

8. The manufacturing method of claim 4, wherein the polypropylene resin pre-expanded beads are subjected to liquid pressure after reduction of the inside pressure.

9. The manufacturing method of claim 4, wherein the polypropylene resin pre-expanded beads are subjected to pressure by a mechanical means after reduction of the inside pressure.

10. An expansion-molding method of polypropylene pre-expanded beads characterized in that polypropylene resin pre-expanded beads obtained by shrinking pre-expanded beads originally having a bulk density of not higher than 0.0930 g/cc to give a bulk volume ratio of 10–75% at normal temperature and normal pressure are expansion-molded in a mold after restoring their bulk volume ratio to 100% substantially by impregnating the interior of each of said beads with air.

* * * * *